3,218,350
VINYL MONOMERS
Philip John Paré, Ho-Ho-Kus, N.J., and Edwin Marvin Smolin, Painesville, Ohio, assignors to American Cyanamid Company, Stamford, Conn., a corporation of Maine
Filed June 4, 1964, Ser. No. 374,560
10 Claims. (Cl. 260—487)

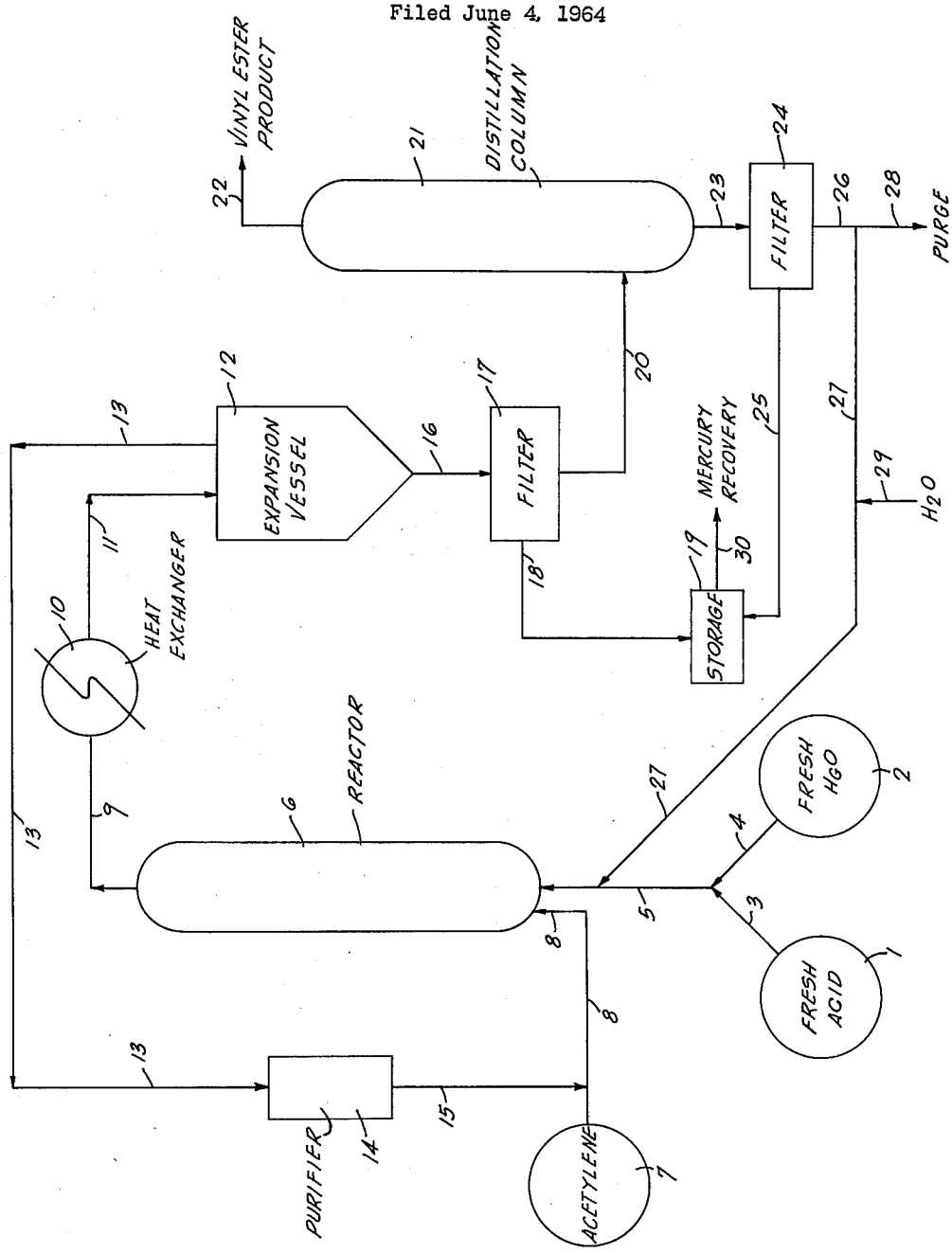

This application is a continuation of our copending application, Serial No. 115,464, filed June 7, 1961, now abandoned.

This invention relates to a process for the production of vinyl esters of halogen acids and to a group of the esters per se. More specifically, this invention relates to a process for the production of vinyl esters of halogen acids comprising reacting acetylene with a halogen acid having the formula (I) 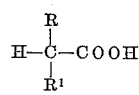

wherein R and $R^1$ are the same or different substituents selected from the group consisting of hydrogen, chlorine, bromine, and fluorine, at least one substituent being a halogen radical or a halogen acid having the formula (II) 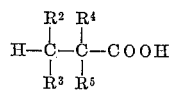

wherein $R^2$, $R^3$, $R^4$ and $R^5$ are the same or different substituents selected from the group consisting of hydrogen, chlorine and fluorine radicals, at least one substituent being a halogen radical. Mercuric oxide is added to the halogen acid before reaction thereof with the acetylene in order to produce the catalytic material which promotes the vinylation process.

We believe that the mercuric oxide, as such, is not the compound which acts as a catalyst in the present process. It is theorized however, that the mercuric oxide reacts with a portion of the halogen acid intended to be reacted with the acetylene and forms a mercury salt of the halogen acid which is believed to possess the catalytic activity necessary to promote the vinylation of the remaining halogen acid.

The liquid phase catalytic reaction between acetylene and halocarboxylic acid in the presence of mercury salts to produce a vinyl ester is a well known reaction. All of the developed processes using this reaction, however, call for the lowest temperature operable i.e., 40 to 50° (for vinyl chloroacetate synthesis) in order to avoid the undesirable formation of an ethylidene bis-compound and have not been developed so as to enable the process to be run continuously.

It has now been found that the yield and conversion of the process can be materially improved by carrying out the process at a temperature within the range of from about 90° C. to about 130° C. without increasing the formation of the undesired ethylidene bis-compound. This is true of both batch and semi-continuous processes. Additionally, we have found that more unit weight of products per unit weight of catalyst can be realized by carrying out the process in a continuous manner and within the temperature range enumerated above. These and other related improvements are provided in the process of the present invention.

It is an object of the present invention to provide an improved process for the production of vinyl esters by the liquid phase reaction of acetylene and a halocarboxylic acid in the presence of a mercury-containing catalyst.

Another object is to provide an improved process for the production of esters, such as vinyl chloroacetate, from acetylene and chloroacetic acid, whereby yields and conversions are increased and more unit weight of ester per unit weight of catalyst is realized.

It is a further object of the present invention to produce a novel class of compounds, specifically a group of the vinyl chloropropionates.

Other objects and advantages will become apparent from the more detailed description set forth hereinbelow.

The preferred mode of catalyst preparation is to react any of the halocarboxylic acids mentioned above, with the mercuric oxide to form the catalyst in situ in the reaction vessel, however, other modes of preparation are also within the scope of this invention. For example, the mercuric oxide and halocarboxylic acid may be reacted beforehand to form the catalytic mercury salt of the halocarboxylic acid. The catalytic mercury salt could then be added, as such, or in a solution, or mixture with the acid, to the reaction vessel in order to catalyze the vinylation of the freshly added halocarboxylic acid. It is possible to use the same halocarboxylic acid to form the catalyst, as is being vinylated, or alternatively, two different halocarboxylic acids may be used; one for forming the catalyst and the other for reaction with the acetylene. Additionally, one may use the mercury salt of any organic acid weaker than those halocarboxylic acids mentioned above, e.g., the mercury salt of acetic acid, propionic acid, butyric acid and the like. However, when a weaker acid is used, the salt must be formed beforehand. In other words, the weaker acid cannot be added directly to the reaction vessel in order to form the catalytic mercury salt in situ therein. By the term "weaker acid" is meant any acid having a dissociation constant lower than the halocarboxylic acid being vinylated.

According to the invention, a halocarboxylic acid corresponding to either Formulae I or II, above, is mixed with mercuric oxide in a suitable reaction vessel and the mixture is heated to a temperature of from about 90° C. to about 130° C. The catalyst concentration is from about 2 to 10 weight percent based on the fresh acid charged. This catalyst concentration must be maintained within this range and the continuous addition of mercuric oxide and acid which reacts therewith must be maintained. When the process is being run continuously, the recycle filtrate of the continuous system, discussed more fully hereinbelow, supplies only a portion of the active catalyst concentration in the reactor. Acetylene is passed into the reaction mixture until no more acetylene reacts, as evidenced by the fact that the gases being withdrawn from the vessel, upon analysis, show substantially pure acetylene. The acetylene partial pressure in the reactor is preferably 1 to 3 atmospheres, although higher pressures may be used. An exotherm occurs upon the addition of the acetylene and the reaction mixture must be cooled both externally and by governing the acetylene input. The use of a reaction temperature within the above-mentioned range, in spite of the disclosure in the prior art, does not result in an increased yield of the undesired ethylidene bis-derivatives and does unexpectedly cause an increase in the yield of the product and conversion of the materials being treated.

Additionally, we have discovered that the process can be made continuous by a series of reaction mixture treatment steps which result in further increased yields and conversions and also result in the realization of more unit weight of vinyl ester product per unit weight of mercuric catalyst utilized, than in a bath process. Evidence of this realization can be seen from Table I below.

The continuous process is carried out under the conditions set forth above, except that the reaction mixture is removed from the reaction vessel, cooled to room temperature, and expanded to remove unreacted acetylene, which is then recycled to the reaction vessel. The remaining reaction mixture is then filtered to remove the mercury sludge accumulated through the partial decomposition of the active mercuric salt catalyst. This treatment results in the production of a mercury sludge filter cake and a liquid filtrate. The filter cake is removed and the filtrate is recovered and passed to a distillation column. The vinyl ester product is removed as an overhead from the distillation column along with other low boiling compounds while the bottoms from the distillation column is recovered and filtered so as to remove any remaining mercury sludge in the form of a second filter cake. A second filtrate is thereby recovered and, after purging a portion thereof, if desired, it is sent back to the reaction vessel. Contrary to the prior art, we have found that this heavy liquid second filtrate enhances subsequent reactions and results in a more efficient, economical process rather than retarding the reaction as was heretofore believed.

The recycle rate of the heavy liquid second filtrate is not critical. The bulk of the second filtrate recovered is recycled to the reaction vessel, with only that amount necessary to prevent build-up in the reaction vessel being purged.

The process of the invention is illustrated in the following detailed description for the production of vinyl chloroacetate from acetylene and chloroacetic acid. References are made to the attached drawing which represents a diagrammatic flow sheet.

Pure molten chloroacetic acid, from the heated storage tank 1, is passed via line 3 and mixed with solid mercuric oxide, from storage tank 2, entering from line 4. The mixed stream is passed via line 5 into reaction vessel 6 wherein it is thoroughly mixed and heated to a temperature from 90° C. to 130° C. Acetylene from storage tank 7 is passed through line 8 into reaction vessel 6 wherein the acetylene bubbles into and is absorbed by the catalyst-chloroacetic acid mixture. The resulting reaction mixture consisting of chloroacetic acid, vinyl chloroacetate, mercury sludge, chloroacetic anhydride, mercuric catalyst, and traces of ethylidene bis-chloroacetate is withdrawn from the reaction vessel via line 9 and passed through heat exchanger 10, wherein it is cooled to room temperature. The cooled reaction mixture is passed via line 11 to expansion vessel 12 wherein unreacted acetylene is separated, withdrawn via line 13, purified in purifier 14 and recycled back to the reaction vessel via lines 15 and 8. The liquid remaining in expansion vessel 12 is withdrawn therefrom and passed through line 16 to filter 17 wherein the mercury sludge resulting from the decomposition of the mercuric salt catalyst is removed in the form of a filter cake via line 18 and passed to storage vessel 19. The filtrate from filter 17 is passed through line 20 to distillation column 21 wherein vinyl chloroacetate and traces of acetaldehyde and vinyl acetate are recovered as an overhead via line 22. The bottoms, consisting largely of unreacted choloracetic acid, chloroacetic anhydride, ethylidene bis-chloroacetate and mercuric catalyst are removed via line 23 and passed to filter 24 wherein the last traces of mercury sludge are removed as the second filter cake via line 25 and passed to storage vessel 19. The mercury sludge in storage vessel 19 is removed via line 30, when necessary, and sent to a mercury recovery unit, not shown. The second filtrate is collected and passed via lines 26 and 27 back to reaction vessel 6. Water is added to the second filtrate via line 29 in order to convert the chloroacetic anhydride therein back to chloroacetic acid which can then be vinylated when it is returned to the reaction vessel. The second filtrate is purged whenever necessary in order to prevent a build up of material in the reaction vessel, via line 28.

In carrying out the novel improved process of the invention, the specific reactants, quantities of reactants, and reactant conditons set forth are subject to substantial variation. For example, the process is not limited to the production of vinyl chloroacetate but is applicable to the preparation of vinyl halo esters of monocarboxylic acids in general. Vinyl chloropropionates, vinyl dichloroacetates, vinyl dichloropropionates, vinyl bromoacetates, vinyl fluoroacetates, vinyl fluoropropionates and the like may be produced by the process of this invention by reacting the respective halocarboxylic acid with acetylene. The acids represented by Formulae I and II, above, are those applicable.

Examples of the acids represented by Formula I, above, include chloroacetic acid, bromoacetic acid, fluoroacetic acid, dichloroacetic acid, dibromoacetic acid, difluoroacetic acid, chlorobromoacetic acid, chlorofluoroacetic acid, bromofluoroacetic acid and the like.

Those compounds represented by Formula II include $\alpha$-chloropropionic acid, $\alpha$-fluoropropionic acid, $\beta$-chloropropionic acid, $\beta$-fluoropropionic acid, $\alpha,\alpha$-dichloro propionic acid, $\beta,\beta$-dichloropropionic acid, $\alpha,\alpha$-difluoropropionic acid, $\beta,\beta$-difluoropropionic acid, $\alpha,\alpha,\beta$-trichloropropionic acid, $\alpha,\alpha,\beta$-trifluoropropionic acid, $\alpha,\alpha,\beta,\beta$-tetrachloropropionic acid, $\alpha,\alpha,\beta,\beta$-tetrafluoropropionic acid, $\alpha$-chloro-$\alpha$-fluoropropionic acid, $\beta$-chloro-$\beta$-fluoropropionic acid, $\alpha$-chloro-$\beta$-fluoropropionic acid, $\alpha$-fluoro-$\beta$-chloro-propionic acid, $\alpha,\alpha$-dichloro-$\beta$-fluoropropionic acid, $\alpha,\alpha$-difluoro-$\beta$-chloropropionic acid, $\alpha,\alpha$-dichloro-$\beta,\beta$-difluoropropionic acid, $\alpha,\alpha$-difluoro-$\beta,\beta$-dichloropropionic acid, $\alpha,\beta$-dichloro-$\alpha,\beta$-difluoropropionic acid, $\alpha,\beta$-difluoro-$\alpha$-chloropropionic acid and the like.

As mentioned above, the present invention is also concerned with a novel class of compounds, i.e., a group of the vinyl chloropropionates. These novel compounds are represented by the formula (III) 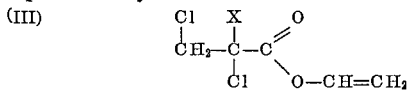

wherein X is selected from the group consisting of hydrogen and chlorine radicals. Compounds which are represented by Formula III are vinyl $\alpha,\beta$-dichloropropionate and vinyl $\alpha,\alpha,\beta$-trichloropropionate.

The compounds produced by the instant processes may be used for preparing flame resistant coatings of polyester resins, paper sizes and also may be polymerized to form resins useful in textile and plastics industries. The following table shows the new and unexpected results achieved by vinyl $\alpha,\beta$-dichloropropionate and vinyl $\alpha,\alpha,\beta$-trichloropropionate in respect to the light stability and flame retardance of these compounds when incorporated in polyester resins.

TABLE I

| Polyester Resin Propylene Glycol-Maleic Anhydride (50/50) Plus | Ultraviolet Weatherometer, 500 Hours, Percent Change in Reflectance | | Burning Rate, ASTM D-757-49, in./min. |
|---|---|---|---|
| | No Phosphorous Added | 1% Phosphorus Added | |
| Control [1] | 8.1 | 2.1 | 0.70 |
| Vinyl dichloroacetate | 3.8 | 4.0 | 0.18 |
| Vinyl $\alpha,\beta$-dichloropropionate | 2.4 | 1.7 | 0.17 |
| Vinyl trichloroacetate | 99.0 | 75.0 | 0.26 |
| (failed entirely) | | | |
| Vinyl $\alpha,\alpha,\beta$-trichloropropionate | 9.7 | 12.2 | 0.18 |

[1] Polyester resin alone.

It can be seen that the chloropropionates show superior results in comparison to their related chloroacetates when incorporated into polyester resins in respect to both light stability and flame retardance.

Both vinyl $\alpha,\beta$-dichloropropionate and vinyl $\alpha,\alpha,\beta$-trichloropropionate are colorless liquids at room temperature. The properties of these two compounds are set forth in Table II hereinbelow.

TABLE II

| Compound | Boiling Point | Refractive Index | Solubility |
| --- | --- | --- | --- |
| Vinyl α,β-dichloropropionate. | 76–77° C. @ 22 mm. Hg. | 1.4665 | Insoluble in H₂O; soluble in acetone, benzene and chloroform. |
| Vinyl α,α,β-trichloropropionate. | 80–81° C. @ 17 mm. Hg. | 1.4779 | Do. |

The following examples are set forth for the purpose of illustration only and are by no means meant to be construed as limitations on the instant invention except as set forth in the appended claims. All parts and percentages are by weight unless otherwise indicated.

*Example 1*

A well dispersed mixture of 189 parts of chloroacetic acid and 9.45 parts of mercuric oxide are heated to 110° C. in a suitable vessel equipped with a stirrer and gas inlet and outlet tubes. Acetylene is passed in under the liquid surface at the rate of 7.8 parts/min. for 68 minutes, the temperature being controlled by initially heating and later cooling the reaction mixture. The reaction mixture is allowed to cool to room temperature and is weighed. Thirty-six parts of acetylene have been picked up, corresponding to a conversion of 69% of the chloroacetic acid. The vinyl chloroacetate is collected by distillation at 55° C./30 mm. and amounts to 142 parts, corresponding to a conversion of 59% of the chloroacetic acid. A sample of the pot residue is treated with diazomethane to convert unreacted chloroacetic acid to methyl chloroacetate and is analyzed by vapor phase chromatography. It contains ethylidene bis(chloroacetate) corresponding to 2.2% of the vinyl chloroacetate. The yield of vinyl chloroacetate based on chloroacetic acid used up is 93%. The weight ratio of VCA:Hg charged is 14.2:1.

*Example 2*

A well dispersed mixture of 189 parts chloroacetic acid and 28.5 parts of mercuric chloroacetate, prepared by reacting mercuric oxide and chloroacetic acid, is heated to 110° C. in a suitable reaction vessel equipped with a stirrer and gas inlet and outlet tubes and acetylene is passed in under the liquid surface at the rate of 7.8 parts/min. for 68 minutes. The temperature is controlled by initially heating and later cooling. The reaction mixture is then allowed to cool to room temperature and is weighed. Thirty-two and seven tenths parts of acetylene have been absorbed corresponding to a conversion of 63% of the chloroacetic acid. The vinyl chloroacetate is collected by distillation at 55° C./30 mm. and amounts to 142 parts, corresponding to a conversion of 59% of the chloroacetic acid. A sample of the pot residue is treated with diazomethane to convert unreacted chloroacetic acid to methyl chloroacetate and is analyzed by vapor chromatography. It contains ethylidene bis(chloroacetate), corresponding to 1.8% of the vinyl chloroacetate. The yield of vinyl chloroacetate based on chloroacetic acid used up is 94%. The weight ratio of VCA:Hg charged is 9.4:1.

*Example 3*

A well dispersed mixture of 200 parts choroacetic acid, and 20 parts mercuric oxide is heated to 63° C. in a suitable vessel equipped with a stirrer and gas inlet and outlet tubes. Acetylene is passed in under the liquid surface at the rate of 7.8 parts/min. for 68 minutes, the temperature being controlled by initially heating and later cooling. The reaction mixture is allowed to cool to room temperature and is weighed. It picks up 24.2 parts of acetylene, corresponding to a conversion of 44% of the chloroacetic acid. The vinyl chloroacetate is collected by distillation at 55° C./30 mm. and amounts to 112 parts, corresponding to a conversion of 44% of the chloroacetic acid. A sample of the pot residue is treated with diazomethane to convert unreacted chloroacetic acid to methyl chloroacetate and is analyzed by vapor phase chromatography. It contains ethylidene bis(chloroacetate), corresponding to 2.6% of the vinyl chloroacetate. The yield of vinyl chloroacetate based on chloroacetic acid used up is 91%. The weight ratio of VCA:Hg charged is 5.6:1.

*Example 4*

An intimate mixture of 379 parts of chloroacetic acid and 21.6 g. of mercuric oxide in a suitable reaction vessel is heated to 110° C. and acetylene is passed in at the rate of 1.04 parts/min. with stirring and cooling or heating, as needed, to maintain the temperature for 80 minutes. The weight gain of 72 parts of acetylene corresponds to 69% conversion of the chloroacetic acid charged. The vessel is fitted for distillation and vinylchloroacetate is removed. Two hundred eighty-four parts of vinyl chloroacetate are collected, corresponding to a conversion of 59%. To the distillation residue is added an identical fresh charge of chloroacetic acid and HgO and the synthesis and distillation steps are repeated. The entire procedure is repeated for a total of ten cycles, the results of which are summarized in Table III below.

TABLE III

[All data are cumulative]

| Cycle | CA Charged | VCA Obtained | CA to VCA Conversion Percent | Ratio, VCA:Hg Charged |
| --- | --- | --- | --- | --- |
| 1 | 378 | 284 | 59.0 | 14.2 |
| 2 | 756 | 631 | 65.5 | 15.8 |
| 3 | 1,134 | 1,059 | 73.2 | 17.6 |
| 4 | 1,512 | 1,474 | 76.5 | 18.4 |
| 5 | 1,890 | 1,935 | 80.3 | 19.4 |
| 6 | 2,079 | 2,331 | 88.0 | 19.4 |
| 7 | 2,457 | 2,636 | 84.2 | 18.8 |
| 8 | 2,646 | 3,021 | 89.6 | 19.0 |
| 9 | 2,930 | 3,347 | 89.7 | 18.6 |
| 10 | 3,214 | 3,709 | 90.6 | 18.6 |

The overall conversion was thus 90.6% and the overall yield of vinylchloroacetate was 96%. The residue of 90 parts contained 59% or 52 parts of ethylidene bis(chloroacetate) corresponding to 1.4% of the vinylchloroacetate. This represents a realization of more unit weight of product per unit weight of catalyst utilized than in a batch process.

*Example 5.—Vinyl-β-chloropropionate*

A suitable reactor is charged with 215 parts of β-chloropropionic acid, 15.5 parts of mercuric acetate, prepared by reacting mercuric oxide and acetic acid, and 0.5 part of hydroquinone. The reactor is heated to 110° C. whereupon a stoichiometric quantity of acetylene gas is passed through the mixture during a 65 minute period. After cooling and filtering the crude reaction product, vinyl-β-chloropropionate is distilled off at 70° C./28 mm. Hg. Therefore, there is collected 137 parts of pure product corresponding to a 52% conversion of β-chloropropionic acid.

*Example 6.—Vinyl α-chloropropionate*

A suitable reactor is charged with 150 parts of α-chloropropionic acid, 7.5 parts of mercuric oxide and 0.5 part of hydroquinone. After heating the reactor to 95° C., a stoichiometric quantity of acetylene gas is passed into the mixture in 60 minutes. The crude product is cooled, filtered and distilled yielding 83 parts of pure vinyl α-chloropropionate boiling at 48° C./20 mm. Hg. The conversion of α-chloropropionic acid to vinyl ester is 45%.

*Example 7.—Vinyl α,β-dichloropropionate*

A suitable reactor is charged with 200 parts of α,β-dichloropropionic acid, 10 parts of mercuric oxide and 0.5 part of hydroquoinone. After heating the reactor to 110° C., a stoichiometric amount of acetylene gas is passed into the reactor in 60 minutes. The crude product is cooled, filtered and distilled yielding 150 parts of vinyl α,β-dichloropropionate boiling at 70° C./20 mm. Hg. The recovery of vinyl ester corresponds to a 64% conversion of α,β-dichloropropionic acid.

Example 8.—Vinyl α,α,β-trichloropropionate

A suitable reactor is charged with 200 parts α,α,β-trichloropropionic acid, 10 parts of mercuric oxide and 0.5 part of hydroquinone. After heating to 130° C., a stoichiometric amount of acetylene gas is passed into the reactor in 45 minutes. Following the reaction, the crude product is filtered and distilled, yielding 114 parts of vinyl α,α,β-trichloropropionate, boiling at 80° C./20 mm. Hg. This recovery of pure product coresponds to a 50% conversion of α,α,β-trichloropropionic acid.

Example 9.—Vinyl bromoacetate

A suitable reactor is charged with 200 parts of bromoacetic acid, 10 parts of mercuric oxide and 0.5 part of hydroquinone. After heating to 120° C., a stoichiometric amount of acetylene gas is passed into the reaction mixture in 65 minutes. The crude reaction product is filtered and distilled, yielding 107 parts of vinyl bromoacetate boiling at 62° C./28 mm. Hg. The recovery of pure product corresponds to 45% conversion of bromoacetic acid.

Example 10.—Vinyl fluoroacetate

A suitable reactor is charged with 150 parts of fluoroacetic acid, 7.5 parts of mercuric oxide and 0.5 part of hydroquinone. After heating to 90° C., a stoichiometric amount of acetylene gas is passed into the reactor in 75 minutes. Following the completion of the reaction, the crude product is filtered and distilled yielding 73 parts of vinyl fluoroacetate boiling at 35° C./50 mm. The recovery of pure product corresponds to a 37% conversion of starting acid.

Example 11.—Vinyl dichloroacetate

Into a suitable vessel is charged 258 parts of dichloroacetic acid, and 12.9 parts of mercuric oxide (5% by weight). There is then passed into this mixture, previously heated to 100° C., acetylene gas over a period of 68 minutes and at a uniform rate so as to provide a stoichiometric quantity of acetylene. The reaction mixture is maintained at a temperature of 100° C. and is then cooled, filtered and distilled. There is obtained 122 parts of vinyl dichloroacetate distilling at 55 to 57° C./25 mm. Hg. The refractive index is 1.4567 at 20° C. and the density is 1.31 g./cc. at 22°. The conversion of dichloroacetic acid is 40.0%.

Example 12.—Vinyl-β-fluoropropionate

A suitable reactor is charged with 150 parts of β- fluoropropionic acid, 7.5 parts of mercuric oxide and 0.5 part of hydroquinone. After heating the reactor to 100° C., a stoichiometric amount of acetylene gas is passed through the mixture in 75 minutes. After cooling and filtering the crude product, an amount of vinyl β-fluoropropionate corresponding to a 52% conversion of acid is distilled off.

Example 13.—Comparative

To a suitable reaction vessel, equipped as in Example 1, are added 140 parts of chloroacetic acid and 9.5 parts of mercuric chloroacetate. Acetylene is passed into the vessel at a rate of 7.8 parts per minute for 47 minutes at a temperature ranging between 60° C. and 73° C. At the end of this time, 2.0 parts of acetylene have been picked up, corresponding to a conversion of 5.0% of the chloroacetic acid. The vinyl chloroacetate produced is collected by distillation and amounts to 5.5 parts, corresponding to a conversion of 3.1% of the acid used up. The pot residue is treated with diazomethane to convert unreacted acid to methyl chloroacetate and is then analyzed by vapor phase chromatography, as mostly ethylidene bis(chloroacetate).

Example 14.—Comparative

To a suitable reaction vessel, equipped as in Example 1, are added 189 parts of chloroacetic acid and 10 parts of mercuric sulfate. Acetylene is charged to the reaction vessel at a rate of 7.8 parts per minute for a total of 40 minutes. The reaction vessel is maintained at a temperature ranging from 95° C.–118° C. At the end of this time 28 parts of acetylene have reacted. No vinyl ester is obtained. The material in the reaction vessel is black and viscous. This charge is heated to 190° C. Some cracking occurs and hydrochloric acid can be detected in the vapor. Fifty-eight parts of free acid are recovered along with 81 parts of ethylidene bis(chloroacetate) in the form of a solid carbonaceous material.

Example 15.—Comparative

Following the procedure of Example 14 except that the catalyst system is added as four parts of sulfuric acid and two parts of mercuric oxide, the reaction is run for 85 minutes at a temperature of 70° C. Nineteen parts of acetylene are picked up, i.e. a 37.0% conversion. A residue of 168 parts, of which 157 parts (by titration) are free acid, is recovered indicating a 17% conversion to by-product. Eleven parts of the residue are analyzed to be acetylene polymer, since the catalyst residues were filtered off. No vinyl ester is obtained.

Example 16.—Comparative

Following the procedure of Example 1, except that two parts of mercuric oxide and 3.3 parts of 70% oleum are added as catalyst, the reaction is allowed to proceed for 32 minutes at a temperature ranging from 52–64° C. Upon recovery, by distillation of the reaction media, thirty parts of ethylidene bis(chloroacetate) are recovered indicating a 15% conversion of chloroacetic acid and 15.4 parts of vinyl chloroacetate indicating a conversion of 6.0% of the chloroacetic acid charged.

Example 17.—Comparative 94.5 parts of chloroacetic acid and 6.42 parts of cadmium oxide are added to a suitable reaction vessel heated to 80° C. Acetylene is added to a pressure of 100 p.s.i. and the vessel is further heated to 110° C. After three hours the vessel is vented and a crystallized mass is recovered. Total uptake of acetylene over this period was negligible indicating no conversion to vinyl chloroacetate.

Example 18.—Comparative

One hundred twenty parts of chloroacetic acid and 12.0 parts of zinc acetate are added to a suitable reaction vessel which is evacuated three times with nitrogen and then heated to 160° C. Acetylene is added to a pressure of 100 p.s.i. After three hours a negligible amount of acetylene has been absorbed. No vinyl chloroacetate is recovered.

Example 19.—Comparative

To a suitable reaction vessel are added 94.5 parts of chloroacetic acid and 11.5 parts of cadmium acetate. The reaction vessel is flushed with nitrogen, heated to 130° C. and pressured with 100 p.s.i. of acetylene. The reaction is continued for 2 hours at which time a negligible amount of acetylene is taken up. No conversion to vinyl chloroacetate is achieved.

Example 20.—Comparative

To a suitable reaction vessel is added 94.5 parts of chloroacetic acid and 2.5 parts of zinc oxide. The vessel is heated to 150° C. and pressured with 100 p.s.i. of acetylene. The reaction is continued for about 130 minutes at which time no acetylene up-take is observed. No recovery of vinyl chloroacetate is achieved.

Example 21.—Comparative

Zinc chloroacetate (5 parts) and 94.5 parts chloroacetic acid are added to a suitable reaction vessel, equipped as in Example 1. Acetylene is passed into the vessel at a rate of 4.0 parts per minute for 100 minutes at a temperature of 158° C. At the end of this time, a negligible amount of acetylene is converted. No vinyl ester is recovered.

We claim:
1. Vinyl α,β-dichloropropionate.
2. Vinyl α,α,β-trichloropropionate.
3. A method for the production of vinyl esters of halocarboxylic acids which comprises reacting acetylene with a compound selected from the group consisting of (1) those having the formula

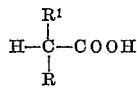

wherein R and R¹ are substituents selected from the group consisting of hydrogen, chlorine, bromine and fluorine radicals, at least one substituent being a halogen radical, and (2) those having the formula

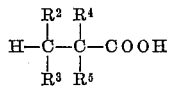

wherein $R^2$, $R^3$, $R^4$ and $R^5$ are substituents selected from the group consisting of hydrogen, chlorine and fluorine, at least one substituent being a halogen radical, at a temperature of from about 90° C. to about 130° C. in the presence of a catalyst consisting of from about 2% to about 10%, based on the amount of halocarboxylic acid utilized, of a mercury salt of an acid selected from the group consisting of (a) those acids represented by (1), above, and (b) those acids represented (2), above, and recovering the resulting vinylated compound.

4. A method for the production of the vinyl ester of chloroacetic acid which comprises reacting acetylene with chloroacetic acid at a temperature of from about 90° C. to about 130° C. in the presence of from about 2% to about 10% of a catalyst consisting of mercuric chloroacetate, based on the amount of chloroacetic acid utilized, and recovering vinyl chloroacetate.

5. A method for the production of the vinyl ester of β-chloropropionic acid which comprises reacting acetylene with β-chloropropionic acid at a temperature of from about 90° C. to about 130° C. in the presence of from about 2% to about 10% of a catalyst consisting of mercuric-β-chloropropionate, based on the amount of β-chloropropionic acid utilized, and recovering vinyl β-chloropropionate.

6. A method for the production of the vinyl ester of chloroacetic acid which comprises reacting acetylene with chloroacetic acid at a temperature of from about 90° C. to about 130° C., in the presence of from about 2% to about 10% of a catalyst consisting of mercuric-β-chloropropionate, based on the amount of chloroacetic acid utilized, and recovering vinyl chloroacetate.

7. A continuous process for the production of vinyl esters of halocarboxylic acids which comprises reacting, in a reaction zone, acetylene with a compound selected from the group consisting of (1) those having the formula

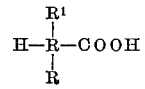

wherein R and R¹ are substituents selected from the group consisting of hydrogen, chlorine, bromine and fluorine radicals, at least one substituent being a halogen radical, and (2) those having the formula

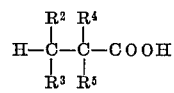

wherein $R^2$, $R^3$, $R^4$ and $R^5$ are substituents selected from the group consisting of hydrogen, fluorine, and chlorine radicals, at least one substituent being a halogen radical, at a temperature of from about 90 C. to about 130° C. and in the presence of a catalyst consisting of from about 2% to about 10% based on the amout of halocarboxylic acid utilized, of a mercury salt of an acid selected from the group consisting of (a) those acids represented by (1), above, and (b) those acids represented by (2), above, to produce a reaction mixture containing a vinyl ester product, unreacted halocarboxylic acid and acetylene, recovering unreacted acetylene from said reaction mixture, recycling said unreacted acetylene to said reaction zone, distilling the remaining reaction mixture to remove as an overhead, a vinyl ester product, filtering the resulting residue to remove mercury sludge therefrom and recycling the filtered residue to the reaction zone.

8. A process according to claim 7 wherein the halocarboxylic acid is chloroacetic acid and the mercury salt is mercuric chloroacetate.

9. A process according to claim 7 wherein the halocarboxylic acid is β-chloropropionic acid and the mercury salt is mercuric β-chloropropionate.

10. A process according to claim 7 wherein the halocarboxylic acid is chloroacetic acid and the mercury salt is mercuric-β-chloropropionate.

References Cited by the Examiner
UNITED STATES PATENTS

| | | | |
|---|---|---|---|
| 2,436,144 | 2/1948 | Howk | 260—487 |
| 2,525,526 | 10/1950 | Coover | 260—487 |
| 2,525,430 | 10/1950 | Dickey | 260—487 |

LORRAINE A. WEINBERGER, *Primary Examiner.*